United States Patent [19]

Kolb et al.

[11] Patent Number: 4,640,398

[45] Date of Patent: Feb. 3, 1987

[54] FRICTION CLUTCH WITH TANGENTIAL LEAF SPRINGS

[75] Inventors: Dieter Kolb, Bad Kissingen; Norbert Pieper, Werneck-Essleben, both of Fed. Rep. of Germany

[73] Assignee: Fichtel & Sachs AG, Fed. Rep. of Germany

[21] Appl. No.: 692,593

[22] Filed: Jan. 18, 1985

[30] Foreign Application Priority Data

Jan. 28, 1984 [DE] Fed. Rep. of Germany ....... 3403024

[51] Int. Cl.⁴ ............................................ F16D 13/71
[52] U.S. Cl. ............................... 192/70.18; 192/70.28
[58] Field of Search ............... 192/70.13, 70.18, 70.28, 192/89 B

[56] References Cited

U.S. PATENT DOCUMENTS

| 4,122,929 | 10/1978 | Maucher et al. | 192/70.18 |
| 4,423,804 | 1/1984 | Kettell et al. | 192/109 R |

FOREIGN PATENT DOCUMENTS

| 0125377 | 11/1984 | European Pat. Off. | |
| 1233670 | 2/1967 | Fed. Rep. of Germany. | |
| 2850425 | 5/1980 | Fed. Rep. of Germany. | |
| 1210329 | 10/1970 | United Kingdom. | |
| 1311637 | 3/1973 | United Kingdom. | |
| 1435908 | 5/1976 | United Kingdom. | |
| 2075618 | 11/1981 | United Kingdom | 192/70.18 |
| 2087001 | 5/1982 | United Kingdom | 192/70.18 |

Primary Examiner—George H. Krizmanich
Attorney, Agent, or Firm—Toren, McGeady and Goldberg

[57] ABSTRACT

In a friction clutch for motor vehicles the pressure plate is connected to the clutch housing for common rotation about the common axis by a plurality of leaf springs which are tangential with respect to the common axis of the clutch housing and the pressure plate. The clutch housing has a predetermined direction of rotation which results from the sense of rotation of the combustion engine which is to be connected by the respective frictional clutch to the gear box of the motor vehicle. The leaf springs have—with respect to the predetermined direction of rotation—a leading end portion and a trailing end portion. The leading end portion of all leaf spring elements are fastened to the pressure plate and the trailing end portions of all leaf springs are fastened to the clutch housing.

1 Claim, 2 Drawing Figures

FRICTION CLUTCH WITH TANGENTIAL LEAF SPRINGS

BACKGROUND OF THE INVENTION

A friction clutch unit for motor vehicles comprises a clutch housing having an axis and adapted for being fixed to a driving disc rotatable with a predetermined direction of rotation. A pressure plate is connected to the clutch housing for common rotation therewith about the common axis and for limited axial movement with respect to the clutch housing. Main spring means are provided which are supported by the clutch housing in axial direction and engage the pressure plate such as to urge the pressure plate towards a clutch disc and said clutch disc towards a friction face of the driving disc. The pressure plate is connected to the clutch housing by a plurality of leaf spring elements which are substantial tangential with respect to the axis. These leaf spring elements have to transmit a torque between the pressure plate and the clutch housing. This torque results from the frictional engagement between the clutch disc unit, on the one hand, and the pressure plate, on the other hand. During pulling operation of the vehicle, i.e. when the vehicle is driven by the internal combustion engine, the leaf spring elements are loaded in a first sense and during pushing operation, i.e. when the running vehicle drives the engine, the leaf spring elements are loaded in a second sense.

STATEMENT OF THE PRIOR ART

In the past one has generally designed the friction clutches of the type described above such that the leading end portions of all leaf spring elements were fastened to the clutch housing and the trailing end portion of all leaf spring elements were fastened to the pressure plate. This corresponds to the understanding that under normal conditions the engine is driving the motor vehicle and the leaf spring element should be tension-loaded under normal operational conditions.

From German Pat. No. 1,233,670 a friction clutch is known in which tangenial leaf spring elements are arranged in both directions of rotation with one part of these tangential leaf springs having their leading end portions fixed to the pressure plate and their trailing end portions to the clutch housing and with the remainder of these tangential leaf springs having their leading end portions fastened to the clutch housing and their trailing end portion fastened to the pressure plate. In this design there are available for both, pulling operation and pushing operation leaf spring elements which transmit the respective torque by tensional forces. In this known constructions those tangential leaf spring elements which have their leading end portions fixed to the clutch housing are connected to the pressure plate by a rivet which passes through a slot in the respective trailing end portion of the leaf spring elements. Thereby a circumferential play is obtained which is necessary because in the operation of release and engagement of the clutch a slight angular movement of the pressure plate with respect to the clutch housing is to be expected due to the finite length of the tangential leaf spring elements. This latter type of frictional clutch is of relatively complicated and expensive design.

OBJECT OF THE INVENTION

It is an object of the present invention to provide a friction clutch of the above stated type in which excessive loading of the leaf spring elements in the buckling sense is avoided, on the one hand, and the complicated and expensive design of friction clutches with two groups of oppositely directed leaf spring elements is avoided, on the other hand.

SUMMARY OF THE INVENTION

A friction clutch unit such as for motor vehicles comprises a clutch housing having an axis and adapted for being fixed to a driving disc rotating with a predetermined direction of rotation. A pressure plate is connected to the clutch housing for common rotation therewith about said axis and for limited axial movement with respect to the clutch housing. Main spring means are supported by the clutch housing, on the one hand, and engage the pressure plate, on the other hand, such as to urge the pressure plate towards a clutch disc and the clutch disc towards a friction face of the driving disc. The pressure plate is connected to the clutch housing by a plurality of leaf spring elements which are substantially tangential with respect to said axis and have—with respect to said predetermined direction of rotation—a leading end portion and a trailing end portion, respectively. The leading end portions of all leaf spring elements are fastened to the pressure plate and the trailing end portions of all said leaf spring elements are fastened to the clutch housing.

The basic concept of this invention is based on the following consideration:

In pulling operation of a motor vehicle, i.e. when the vehicle is driven by the internal combustion engine, in certain operational situations brief torque peaks of a multiple of the maximum engine moment delivered by the internal combustion engine occur. Such an operational situation arises by way of example when, starting form pushing operation—i.e. when the engine is driven by the pushing vehicle—suddenly the throttle of the internal combustion engine is fully opened. The peak moment then occurring is dependent upon various factors, e.g. the torque of the internal combustion engine, the masses of the internal combustion engine, the masses of the vehicle and upon the resilience of the entire drive system from the internal combustion engine to the driven wheels. This entire drive system is to be regarded as a structure capable of vibration. These torque peaks occurring in pulling operation of the engine are substantially determined in design and can also be to a certain extent dependent on the condition of the road surface, but they can be influenced only to a slight extent by the driver. They are to be regarded therefore as less critical as far as torque transmission from the presser plate to the clutch housing is concerned.

In pushing operation when a torque is transmitted from the drive wheels through the friction clutch to the internal combustion engine the driver's influence on the maximum value of torque to be transmitted from the drive wheels to the internal combustion engine via the friction clutch is substantially greater. Therefore, greater torques must be expected, i.e. this operation is much more critical with respect to the transmission of torque from the pressure plate to the clutch housing through the leaf spring elements.

In accordance with the present invention the leaf spring elements are loaded in the tensional sense only when the most critical situation arises, i.e. when pushing operation occurs. Due to this arrangement of the tangential leaf spring elements they can be mounted in the usual and economic way, namely such as to extend in only one direction with respect to the normal sense of rotation of the driving engine. On the other hand, the leaf spring elements as being less loaded can be made slighter and thus cheaper since the required security range can be reduced.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

The invention will be explained in greater detail below by reference to the example embodiment. In detail.

DESCRIPTION OF THE PREFERRED EMBODIMENT

Figure 1:
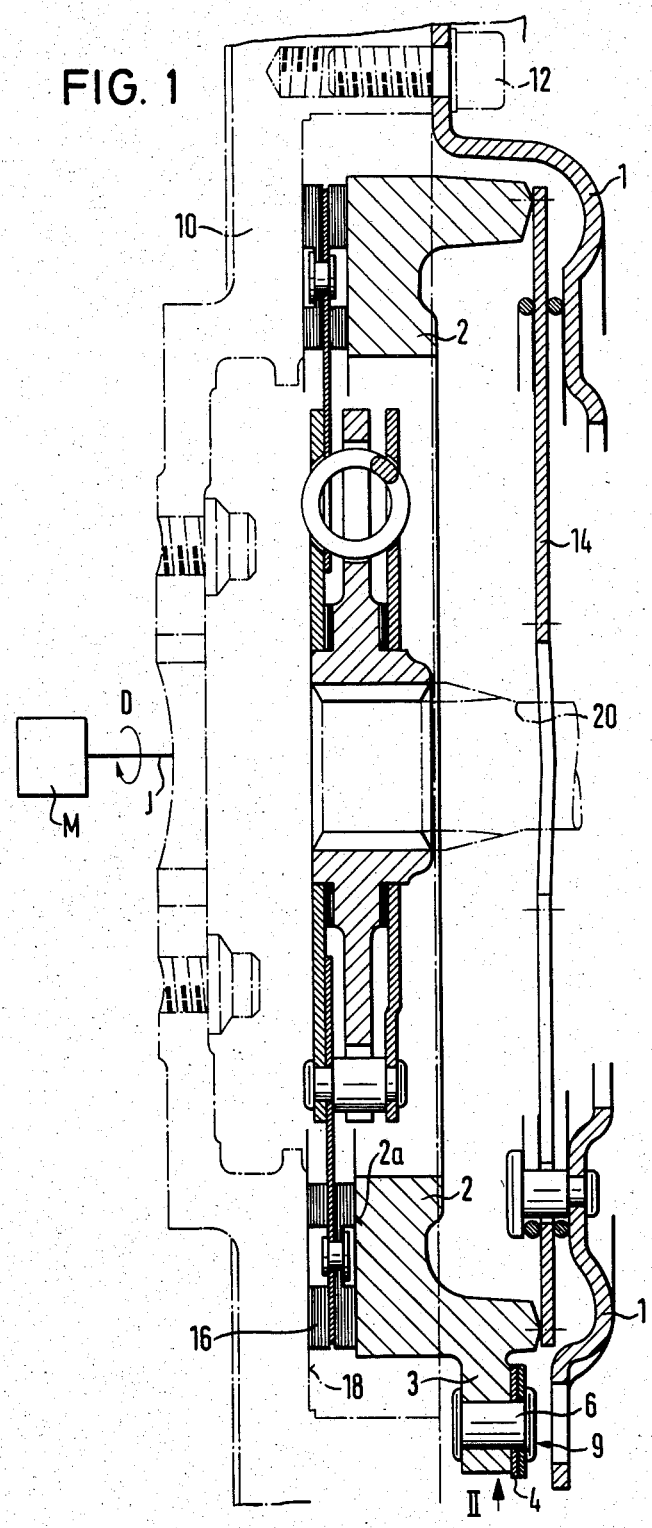
FIG. 1 shows a longitudinal section through the friction clutch of the invention with the sectional plane containing the axis of the driving disc and the clutch housing.
Figure 2:
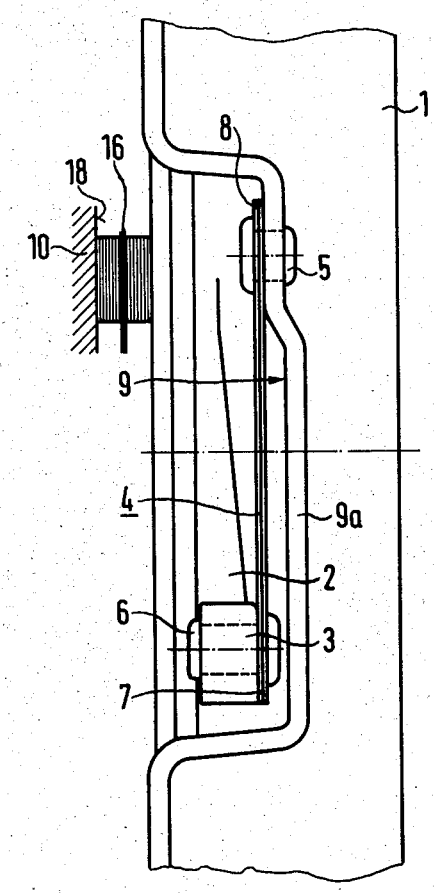
FIG. 2 shows a detail of the friction clutch of FIG. 1 when regarded in the direction of the arrow II of FIG. 1.

In FIG. 1 a driving disc 10 is driven from an internal combustion engine M through an input shaft I in a predetermined rotational sense D. A clutch housing 1 is fastened to the driving disc 10 by a plurality of bolts 12. A pressure plate 2 is connected to the clutch housing 1 by a plurality of tangential leaf spring elements 4. These leaf spring elements are best seen from FIG. 2. The leaf spring elements can be single leaf spring elements or sandwich leaf spring elements. The leaf spring elements 4 have, as can be seen from FIG. 2, a trailing end portion 8 which is connected by rivets 5 to the clutch housing 1, namely to a substantially circumferential extending wall portion 9a of a respective aperture 9. The apertures 9 are distributed along the circumference of the clutch housing 1 with substantially equal angular spaces therebetween. The leading terminal portions 7 of the leaf spring elements 4 are fastened by rivets 6 to radial projecting noses 3 of a pressure plate 2. The terms "leading" and "trailing" are referred to the direction of rotation prescribed by the motor and indicated by arrows in FIGS. 1 and 2. The pressure plate is loaded in axial direction by a membrane spring 14 which is supported by the housing 1 and acts onto the presser plate 2 such as to urge the presser plate 2 with its friction face 2a towards a clutch disc unit 16 interposed between the pressure plate 2 and the driving disc 10. The pressure plate 2 urges the clutch disc unit 16 into frictional engagement with a friction face 18 of the driving disc 10. So a torque can be transmitted from the driving disc 10 to the clutch disc unit 16 and from the clutch disc unit 16 through an output shaft 20 to the gear box (not shown). As the pressure plate 2 is in frictional engagement with the clutch disc unit 16, part of the torque from the driving disc 10 to the clutch disc unit 16 flows through tangential leaf springs 4. As can be seen from FIG. 2 in pulling operation, when a torque is to be transmitted from the motor to the gear box through the clutch, that portion of the torque which flows through the leaf spring elements 4 results into a "buckling stress" onto the leaf spring elements 4. As, however, the torque peaks arising during pulling operation are known and of limited value one can select the leaf spring elements 4 such as to be able to transmit the torque without risk of damage.

On the other hand, in case of pushing operation, when the drive wheels transmit a torque to the engine through the clutch the leaf spring elements 4 are subjected to tensional stress only. Since in the pushing operation the higher torque peaks are to be expected, care has been taken to transmit the maximum torques to be expected by tension forces in the leaf spring elements. Experiments have shown that the friction clutches of this invention are less subject to permanent bending of the leaf spring elements than friction clutches in which the leaf spring elements are fastened with their leading portions to the clutch housing.

While a specific embodiment of the invention has been shown and described in detail to illustrate the application of the inventive principles, it will be understood that the invention may be embodied otherwise without departing from such principles.

The reference numerals in the claims are only used for facilitating the understanding and are be no means restrictive.

What is claimed is:

1. A friction clutch unit for engine powered wheeled motor vehicles, comprising a clutch housing (1) having an axis and adapted for being fixed to a driving disc (10) rotating with a predetermined direction of rotation (D) in the pulling direction when the motor vehicle engine drives the motor vehicle as opposed to the pushing direction when torque is transmitted from the drive wheels to the motor vehicle engine, a pressure plate (2) connected to said clutch housing (1) for common rotation therewith about said axis and for limited axial movement with respect to said clutch housing (1), main spring means (14) supported by said clutch housing (1) and engaging said pressure plate (2) such as to urge said pressure plate (2) towards a clutch disc (16) and said clutch disc (16) towards a friction face (18) of said driving disc (10), means for connecting said pressure plate (2) to said clutch housing (1) consisting of a plurality of leaf spring elements (4) spaced circumferentially with respect to the clutch housing axis and which are substantially tangential with respect to said axis and have—with respect to said predetermined direction of rotation—a leading end portion (7) and a trailing end portion (8), respectively, the leading end portions (7) of all leaf spring elements (4) being fastened to said pressure plate (2) and the trailing end portions (8) of all said leaf spring elements (4) being fastened to said clutch housing (1), said leaf spring elements are secured to said pressure plate and clutch housing in a play-free manner.

* * * * *